United States Patent
Herbert IMS

(10) Patent No.: US 6,279,630 B1
(45) Date of Patent: Aug. 28, 2001

(54) NON PNEUMATIC TIRES

(75) Inventor: Horst Otto Herbert IMS, Waterloo (CA)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/220,009

(22) Filed: Dec. 23, 1998

(51) Int. Cl.$^7$ .............. B60B 15/04; B60B 9/00; B60B 9/04; A63C 17/22
(52) U.S. Cl. ............... 152/84; 152/5; 152/17; 152/74; 301/5.3
(58) Field of Search ................ 152/1, 5, 7, 112, 152/12, 17, 69, 72, 74, 75, 31, 323, 80, 84; 301/64.7, 5.3

(56) References Cited

U.S. PATENT DOCUMENTS

| | | |
|---|---|---|
| 1,597,381 | 8/1926 | Lambert . |
| 2,603,267 | 7/1952 | Simpson ................. 152/7 |
| 2,684,099 | 7/1954 | Henry ..................... 152/7 |
| 2,686,549 | 8/1954 | Henry ..................... 152/7 |
| 3,604,756 * | 9/1971 | Gruber ................. 301/64.7 |
| 4,170,384 | 10/1979 | Rotheiser ............... 301/63 |
| 4,226,273 | 10/1980 | Long et al. ............ 152/326 |
| 4,235,270 | 11/1980 | Kahaner et al. ........... 152/7 |
| 4,444,435 | 4/1984 | Honsa ................... 301/63 |
| 4,784,201 | 11/1988 | Palinkas et al. ......... 152/323 |
| 4,921,029 | 5/1990 | Palinkas et al. ......... 152/11 |
| 4,940,445 * | 7/1990 | DesPortes ............. 152/323 |
| 5,061,013 | 10/1991 | Hed et al. .............. 301/63 |
| 5,226,673 * | 7/1993 | Cech ................... 301/5.3 |
| 5,343,916 | 9/1994 | Duddey et al. ........... 152/5 |
| 5,897,170 * | 4/1999 | Keleny ................. 301/5.3 |
| 5,979,992 * | 11/1999 | Calderone et al. ....... 152/323 |

FOREIGN PATENT DOCUMENTS

| | | |
|---|---|---|
| 247211 | 2/1963 | (AU) . |
| 1239854 | 8/1988 | (CA) . |
| 1306410 | 8/1992 | (CA) . |
| 1328797 | 4/1994 | (CA) . |
| 856560 | 11/1952 | (DE) . |

* cited by examiner

Primary Examiner—S. Joseph Morano
Assistant Examiner—Jason R. Bellinger
(74) Attorney, Agent, or Firm—Webb Ziesenheim Logsdon Orkin & Hanson, P.C.

(57) ABSTRACT

A new class of non-pneumatic tires is proposed, comprising an exterior torus and an interior torus and in the space between them a waveform undulating ribbon like structure having a constant wavelength and the undulating direction being perpendicular to the plane of rotation of the tire, an example of this class of non-pneumatic tires being where the undulations are in the form of a succesion of semicircular modules alternating one after another in the space between the two toruses;the new class of non-pneumatic tires has a superior capability for fatigue and load compared with the prior art.

17 Claims, 10 Drawing Sheets

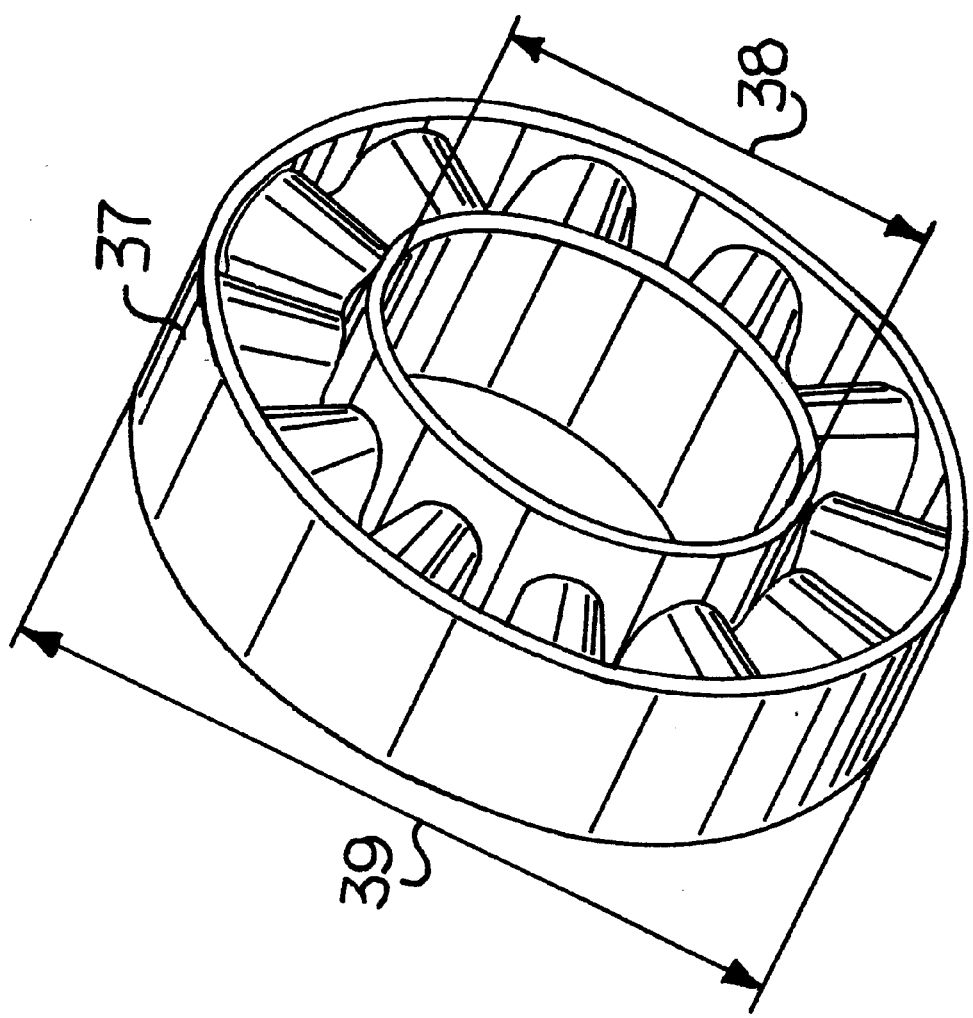
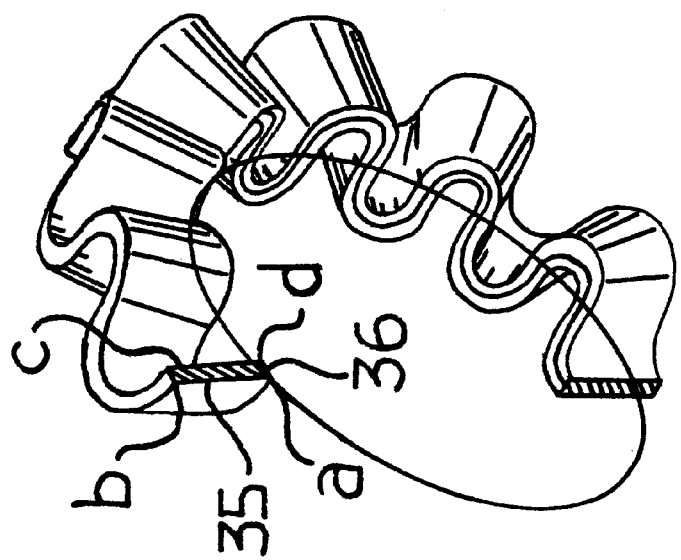
Fig. 6

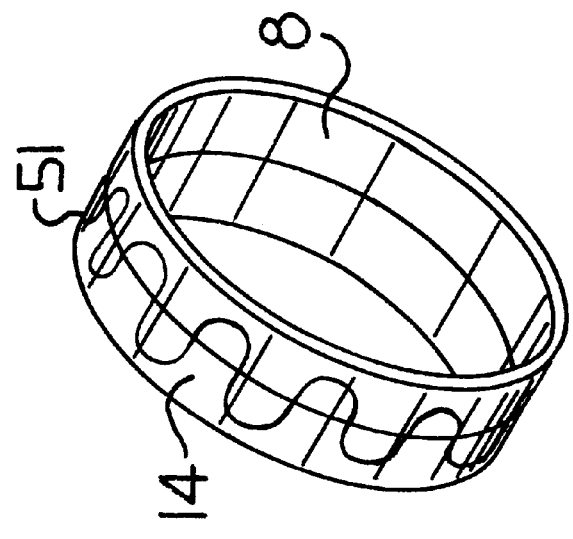
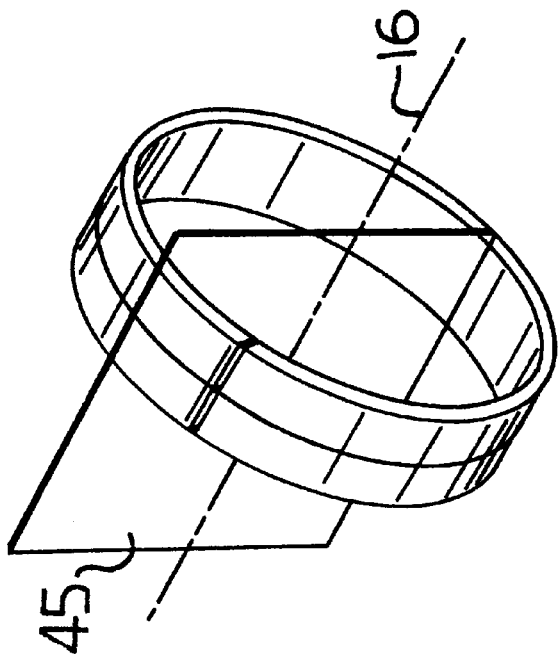
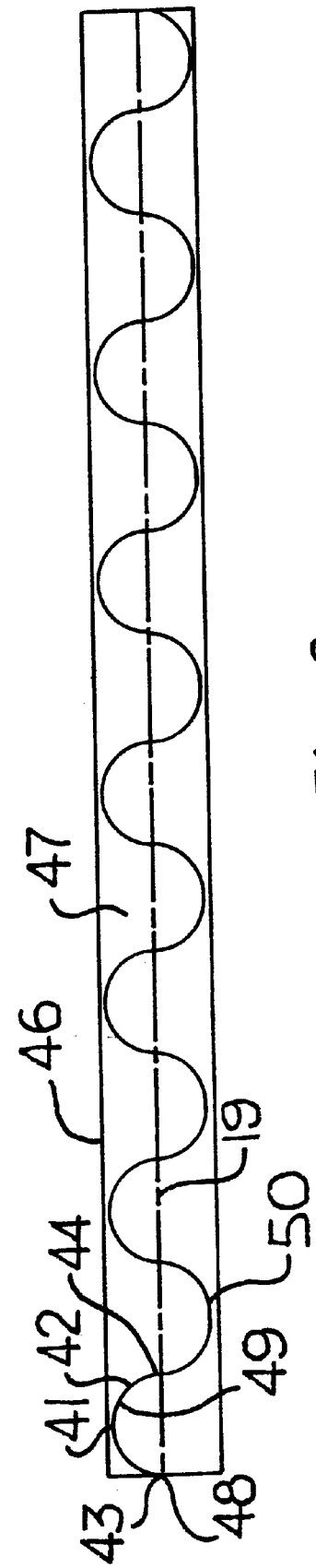
Fig. 8

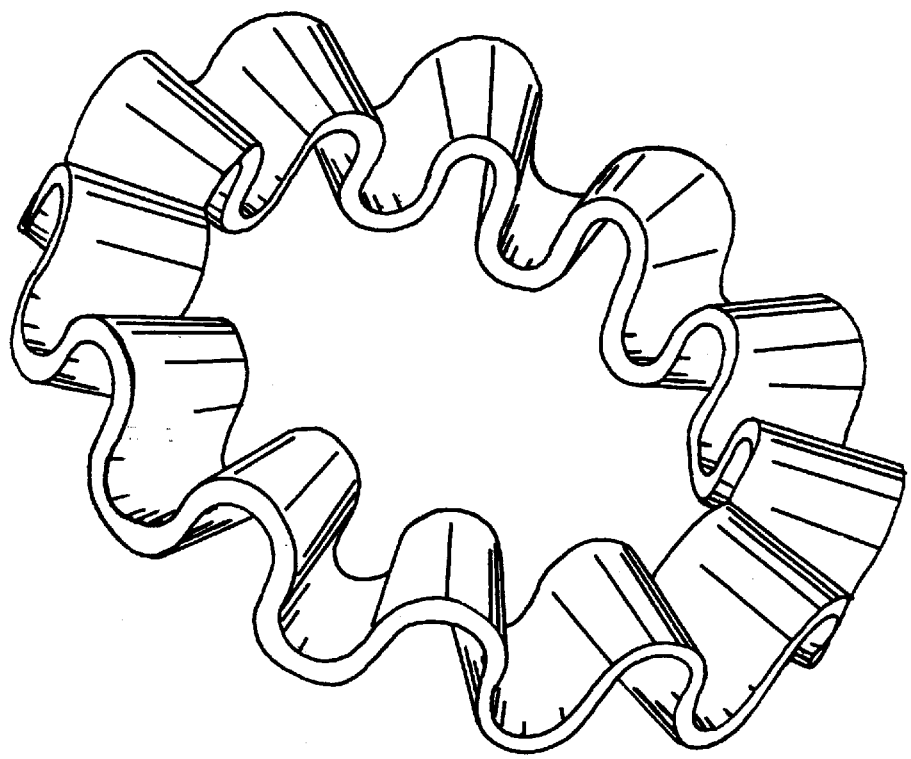
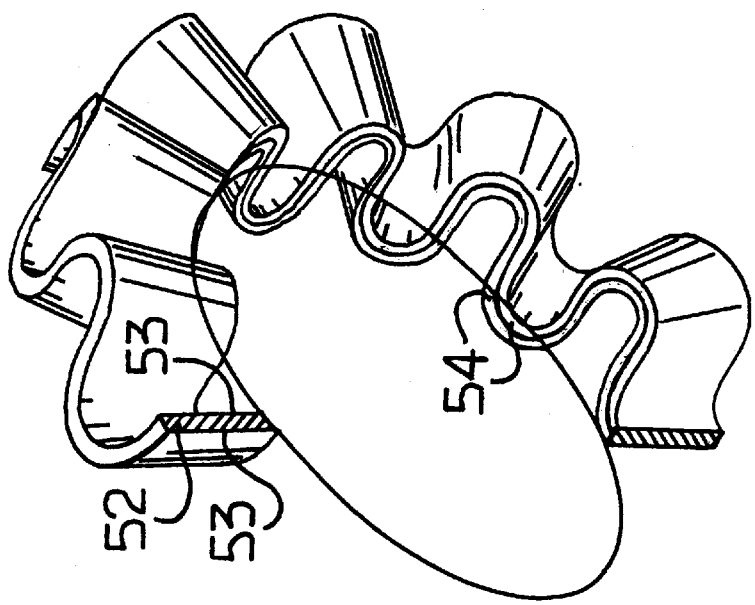
Fig. 9

NON PNEUMATIC TIRES

BACKGROUND OF THE INVENTION

1. Field of the Invention

This invention relates to the field of so called non pneumatic tires. More particularly, this invention relates to a class of wheels involving outer and inner rings and a space between them where some flexing structures are provided. The said flexing structures being in form of web-like objects able to flex under in the load and providing an equivalent of the pneumatic tire behaviour.

This class of wheels including the "non-pneumatic" term was started by pioneers like Long at Goodyear in the late seventies and Palinkas,Hybakken,Ims,Pajtas at Uniroyal in late eighties and is believed to play a significant role in the future of wheel technology. All these pioneers dedicated their life to the rubber and polyurethane wheel applications and Horst Ims worked at Pennemunde as a mechanical engineer later specializing in polymer technology.

2. Prior Art

The prior art is described in the Long&Rye Palinkas, Hybakken, Pajtas patents and essentially is based on a central web in the form of a ring/disk placed symmetrically in the space between the outer and inner annular rings of the wheel. Essentially this disk is the main load carrying object of the wheel.

The concept of two annular rings with a space between them making the basic structure of the wheel was probably first time presented by Long and Rye in U.S. Pat. No. 4,226,273. The space between the said rings was occupied by some flexing structures anticipating the later work of Palinkas and all.

Coming back to the closest prior art (Palinkas and all) this load carrying ring/disk is reinforced or supported laterally on each side by inclined webs so that when the load is applied they can flex thereby simulating the effect of a pneumatic tire.

When rolling the structure formed of the central web and the lateral webs are flexing under load. The central web has a buckling type of flexing and the lateral webs simply bend.

The tests proved in time that the stress spectra generated in the central and lateral web structure has peaks in the area connecting the central disk with the inner surface of the outer annular ring (the rim) of the wheel.

The cyclic nature of the stress combined with the magnitude of it generated a combined effect of either heat or fatigue or a combination of these depending on the load and the time the wheel was used.

Even at normal loads—in the case of spare tire application—after a certain number of cycles the area where the central disk is united with the rim overheated reaching temperatures in excess of 120 to 150 degrees Celsius. The material melted and affected the area between the rolling rim and the web structure ending in failure of the wheel.A combination of hysteresis and low heat dissipation capability inherent to polymers created the failure conditions. In the case of polyurethane this was even more dangerous because the polyurethane melts when it reaches a certain temperature.

This initial class of non pneumatic tires had a lot of hope to use the flexing effect and to eliminate the hysteresis melting typical for the solid tires. In that case the only wear expected from the tire was supposed to be the outer lining involved directly in the rolling contact-which was a wear based on abrasion mainly, Velcro effect and flakes generated by Hertz/Palmgren effect. However this did not happen, the stumbling block being the generation of the hot areas which produced the failure of the wheel.

The heating effect was also generated by the fact that, the outer rim was softer than the web flexing/supporting structure so the deformation and the shearing and compression stress structure was different for the two materials, resulting in stressing the bonding area and also the structural connection between the central disk/web and the annular outer element.

It is an object of this invention to provide a flexing supporting structure between the inner and outer rings of the non pneumatic tire to reduce the stress and heat generated by hysteresis so that the wheel to be used safely in high speed and safety applications-the only wear expected being the one associated strictly with the outside surface of the wheel,.

It is yet a further object of this invention to provide a wheel with increased load capacity.

It is a still further object of this invention to provide a wheel easier to manufacture than those in the prior art.

SUMMARY OF THE INVENTION

The foregoing and other objects are achieved by this invention by the fact that is involving/comprising the following:

an exterior torus having an inside diameter and an exterior diameter and having a thickness and having a width and having an inside and an outside surface;

an interior torus having an inside diameter and an exterior diameter and having a thickness and having a width and having an inside and an outside surface;

the interior and the exterior toruses being placed in such a way that they share the same centre of gravity and the same axis of rotation/symmetry;

the exterior torus having the outside diameter smaller than the exterior diameter of the exterior torus;

in the space between the exterior Torus and the interior torus being a waving, undulating waveform structure comprising the following and defined as follows:

on the outer surface of the inner torus being a median circle resulted from the intersection of a plane perpendicular to the axis of rotation of the inner torus, with the outer surface of the inner torus, and passing through the center of gravity of the inner torus;

in relation with the medial circle and contained on the outer surface of the inner torus a waveform curve having amplitude and wavelength is generated as follows:

the wavelength is defined along the circumference of the median circle and the amplitude variation being defined perpendicularly to the median circle plane and the said waveform curve has a constant wavelength and the number of wavelengths contained in the median circle is an integer;

the areas contained between the waveform curve and the median circle associated with the half of the wavelength being constant and symmetric/equal with each other and being identical in terms of profile and form as well as the areas associated with the quarters of the wavelength being also constant and symmetric/equal with each other and being identical in terms of profile and form;

therefore on the outer surface of the inner torus we have along the median circle as a circular axis a symmetric/regular oscillating curve with constant wavelength and amplitude, the number of wavelengths contained in the median circle being an integer;

a generating profile defined as follows:

a plane perpendicular to the waveform curve, therefore intersecting the waveform curve in only one point, the perpendicular plane intersecting the inner surface of the outside torus and the outer surface of the inner torus;

whereby from the intersecting resulting intersection curves on the inner surface of the exterior torus and the outer surface of the interior torus, these intersection curves, depending of the position of the perpendicular plane could be either straight lines or slightly curved lines;

on each line of the intersection between the perpendicular plane and the inner surface of the outer torus and the outer surface of the inner torus are selected 2 points, the points from the inner surface of the outer torus are united with the points from the outer surface of the inner torus, by uniting curves contained in the perpendicular plane in such a way that these uniting curves are not intersecting each other and they are contained in the space between the toruses, in such a way that the four points, the uniting curves and the intersecting lines define a closed plane surface or profile having at the top and bottom the intersecting lines of the perpendicular plane with the inner surface of the exterior torus and with the outer surface of the interior torus and on the sides the said uniting curves contained in the perpendicular plane;

the closed plane surface/profile defined as above being hereinafter named the generating closed surface/contouring/profile;

it is important to remember that the generating closed surface/contouring/profile is contained in the perpendicular plane therefore is all the time perpendicular on the wave form curve, the upper and lower lines varying depending on the intersection with the of the toruses;

the generating process is started from a starting point which can be any point on the wave form curve but for the ease of understanding it is supposed to start from a point where the wave form curve is intersecting the median circle;

the surface/solid generating process is done by moving the genetrated closed surface/contouring/profile along the wave form curve respecting the above conditions, then uniting the curves describing/contouring the surface structure of the said wave form undulating structure between the toruses;

whereby, the waveform undulating structure being unitized/rigidized together by casting or any other known approach, forms a toroidal elastic structure having an inner diameter, which is the inner diameter of the interior torus and an outside diameter which is the outside diameter of the exterior torus;

whereby the toroidal elastic structure has on the outside a rim for rolling and on the inside a hub to provide a wheel made of the toroidal elastic structure and the rim and hub;

in a simpler case, the wave form curve on the outer surface of the inner torus being defined as follows:

a curve in form of a semicircle called the semicircle module having a beginning and an end these being diametrally opposed;

the inner torus being cut with a plane containing its axis of symmetry; the inner torus then is unfolded and on the unfolded outer surface and in reference with the median circle above defined and also unfolded, a wave form curve is traced characterized by the fact that it is formed of a succession of semicircle modules all having the same radius;

therefore if the wave form curve is starting from a point on the median circle, there we have placed the first semicircle module with the beginning in the starting point and the end diametrally opposed but on the median circle unfolded ,and after this another semicircle module but rotated accordingly to permit a continuation of the waveform curve; so the wave form curve is a continuous unicursal succession of semicircle modules;

then the unfolded torus with the waveform curve as described above is brought back to toroidal form ,in this way having the wave form curve defined on the outer surface of the inner torus;

a contouring profile is defined as above except for the fact that the uniting curves are straight lines forming parallel sides centered about the waveform curve intersecting with the axis of symmetry/rotation of the toruses therefore all the time are perpendicular to the outer surface of the inner torus and on the inner surface of the exterior torus;

whereby the straight lines as defined above are equally distanced from the wave form curve on the inner surface of the inner torus;

whereby at the areas of intersection of the waveform structure and the inner/outer surfaces of the toruses there are provided appropriate fillets to reduce the concentration stresses;

whereby the wave-like structure has a width which is twice the amplitude of the wave which is less than the width of the toruses;

The above described non-pneumatic tire has the advantage of using the buckling capacity of curved or circular cylindrical structures as opposed the vertical web like as in the prior art. This is increases the wheel capacity and reduces the stresses and eliminates the heat generation in the dangerous areas. The tests made by the author proved an improved performance on terms of load/speed and fatigue substantially higher than the prior art solutions. The tests made by the author suggests that this new class of non-pneumatic tires could have substantial applications in areas where safety and long term operation is important.

BRIEF DESCRIPTION OF THE DRAWINGS

These and other objects, features and advantages of the invention will be better understood by reading the following detailed description in conjunction with the attached drawings, in which:

FIG. 6 is representing the process of generating the surface of the wave form structure;

FIG. 8 is representing the defining a simpler profile based on semicircular modules;

FIG. 9 is representing the generating process of the simpler variant;

DETAILED DESCRIPTION OF THE DRAWINGS

Figure 1:
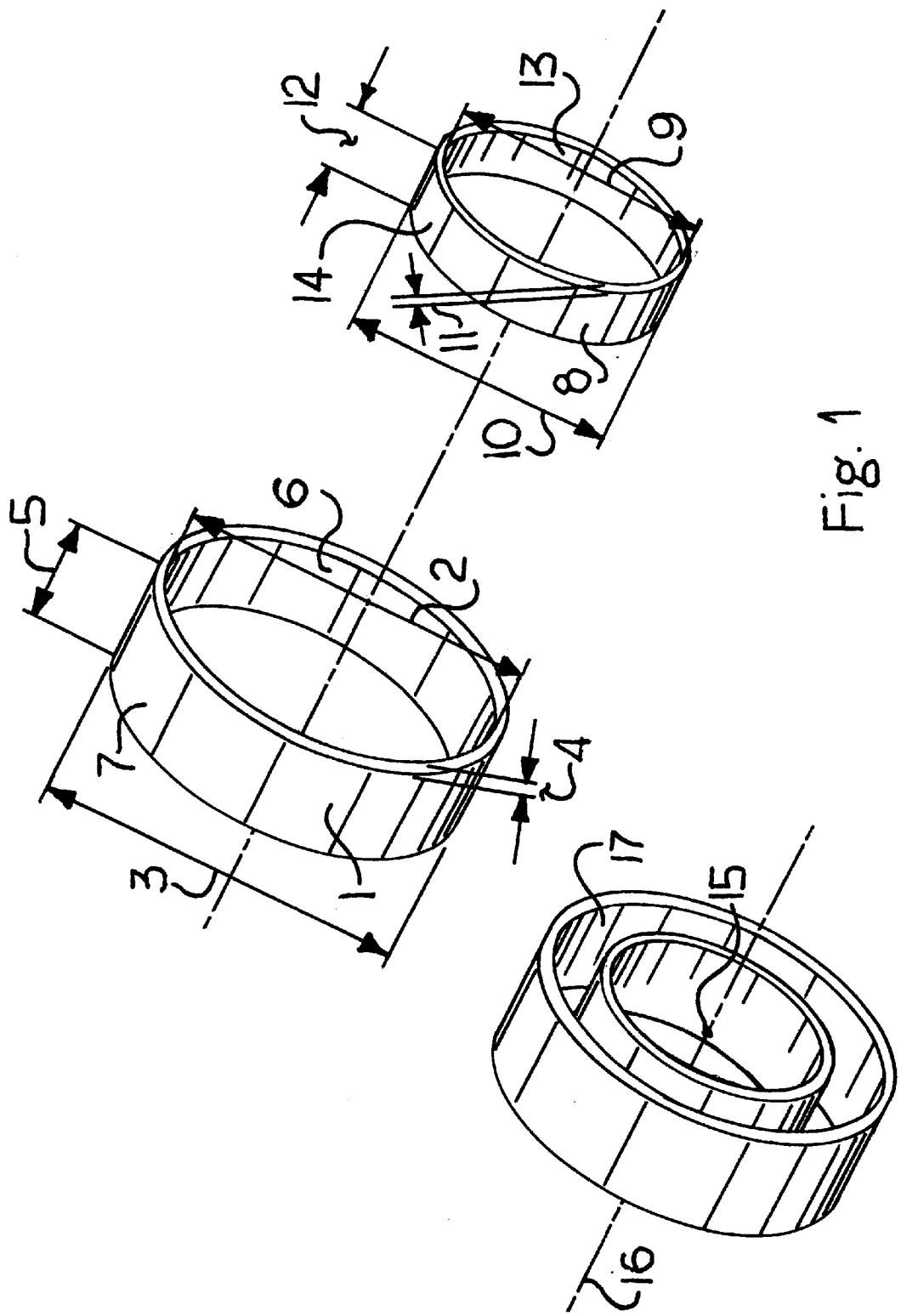
FIG. 1 is a representation of the exterior/interior torus structure.
Figure 2:
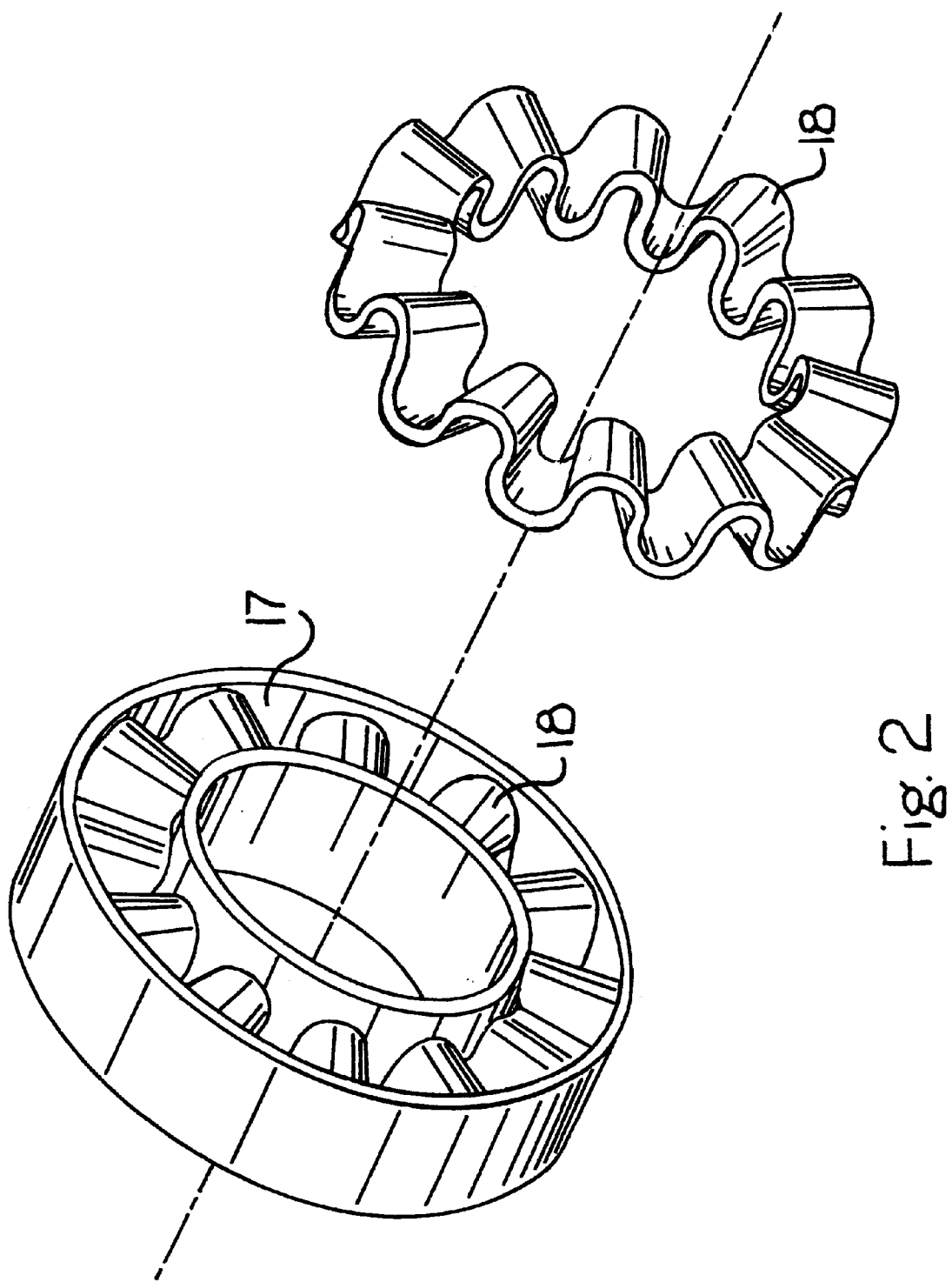
FIG. 2 is a representation of the torus together with the wave form undulating structure according with the invention.
Figure 3:
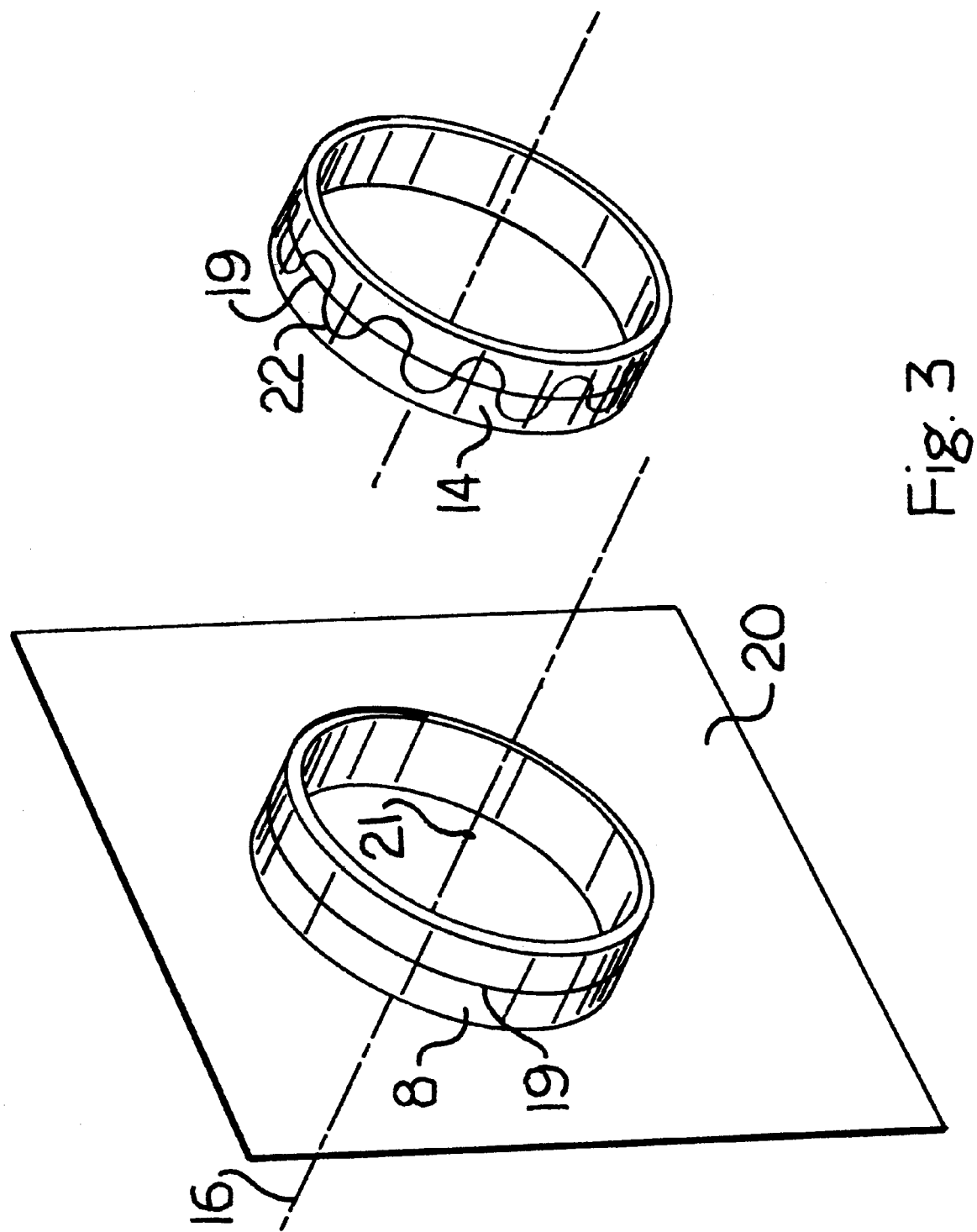
FIG. 3 is representing the concept of the median circle.
Figure 4:
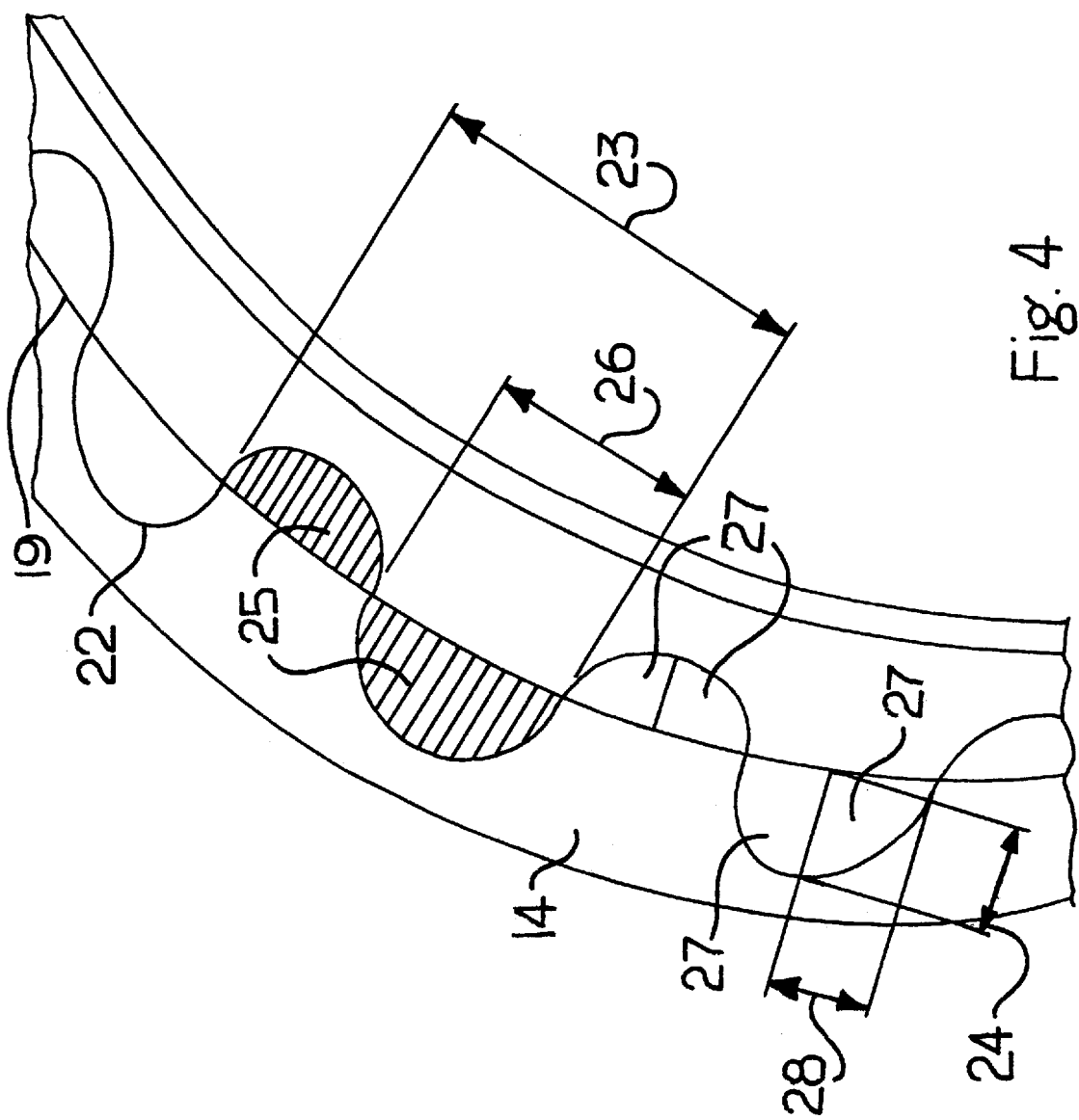
FIG. 4 is representing the waveform curve on the outer surface of the inner torus.
Figure 5:
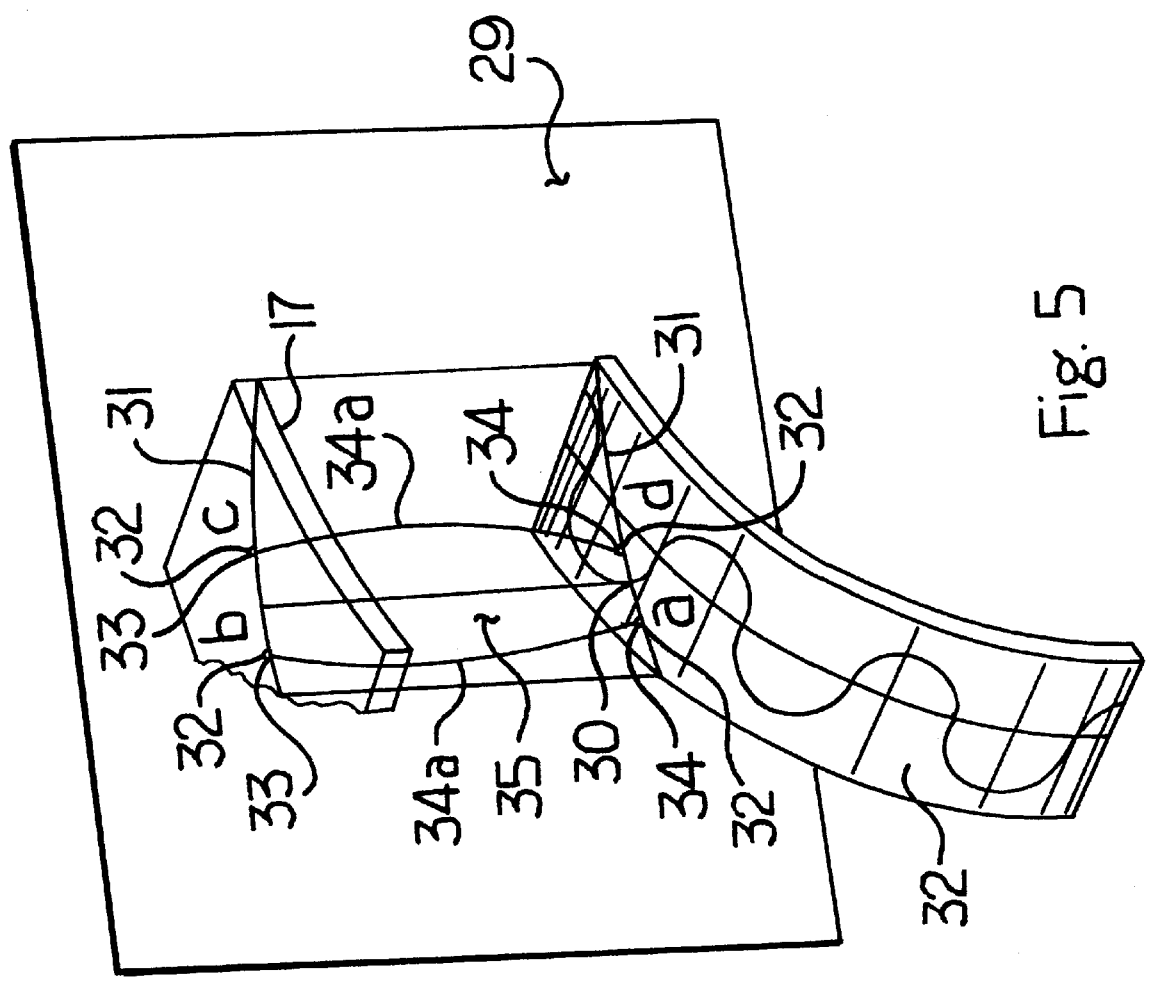
FIG. 5 is representing the generating/contouring profile.
Figure 7:
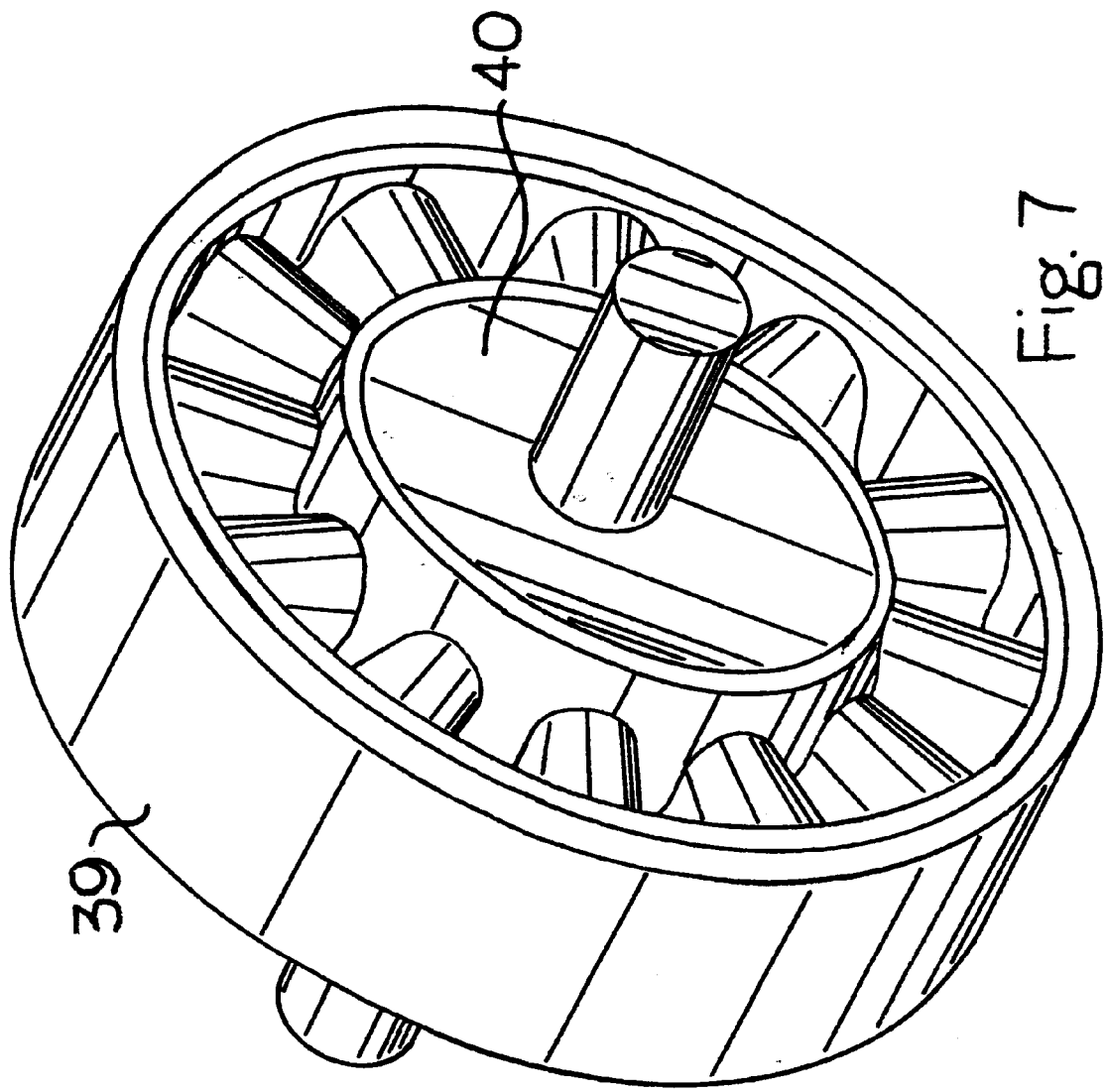
FIG. 7 is representing the non pneumatic wheel assembly according with the invention.
Figure 10:
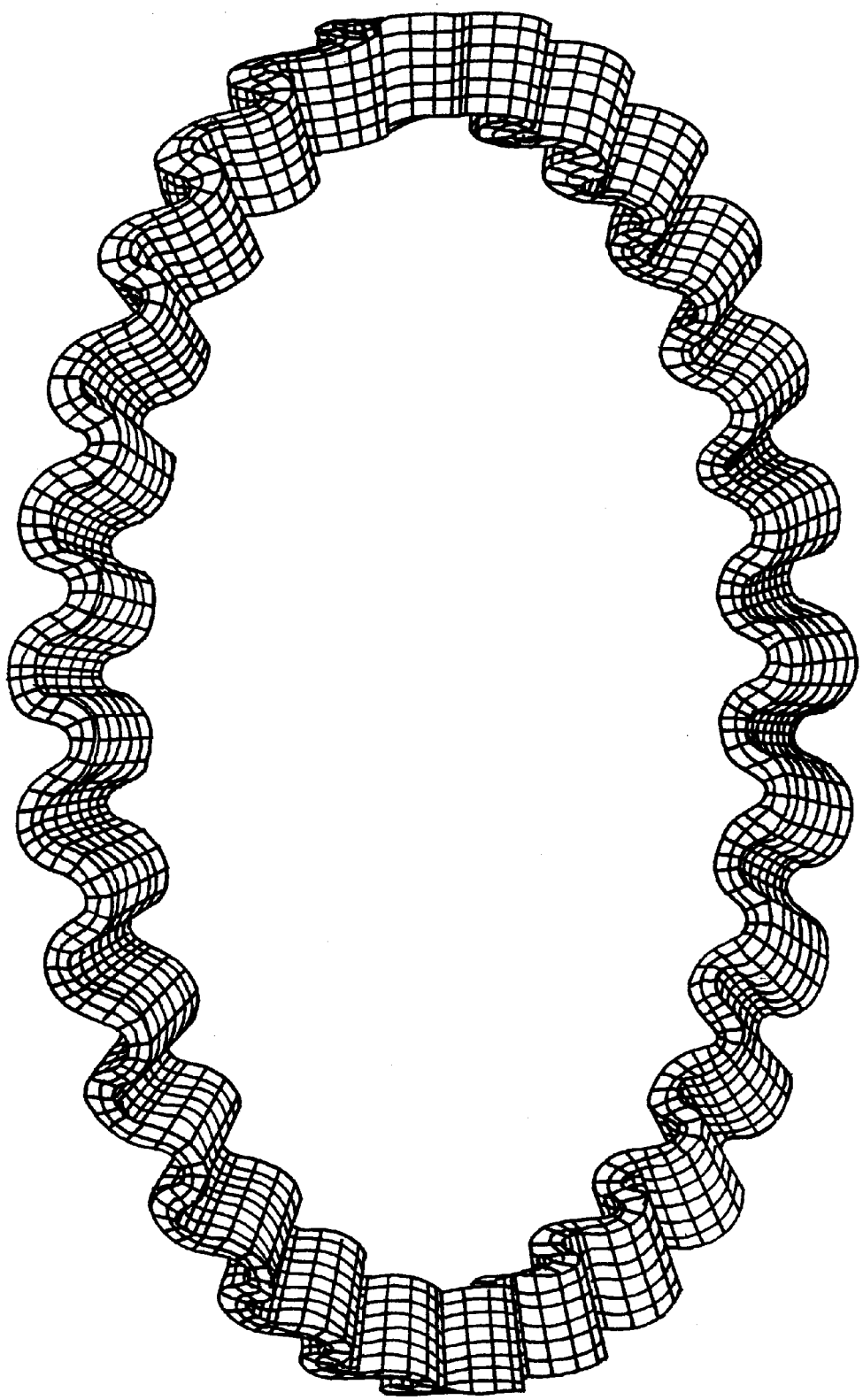
FIG. 10 is a 3D illustration of a wave form undulating structure/ribbon.

Below is given a illustration of the invention in relation with the FIGS. 1,2,3,4,5,6,7,8,9 and 10, describing a non pneumatic tire involving/comprising the following:

an exterior torus 1 having an inside diameter 2 and an exterior diameter 3 and having a thickness 4 and having a width 5 and having an inside 6 and an outside surface 7;

an interior torus 8 having an inside diameter 9 and an exterior diameter 10 and having a thickness 11 and having a width 12 and having an inside 13 and an outside surface 14;

the interior and the exterior toruses being placed in such a way that they share the same center of gravity 15 and the same axis of rotation/symmetry 16;

the interior torus having the outside diameter smaller than the exterior diameter of the exterior torus;

in the space 17 between the exterior torus and the interior torus being a waving, undulating waveform structure 18 comprising the following and defined as follows:

on the outer surface of the inner torus being a median circle 19 resulting from the intersection of a plane 20 perpendicular on the axis of rotation of the inner torus 16, with the outer surface of the inner torus, and passing through the center of gravity 21 of the inner torus;

in relation with the median circle and contained on the outer surface 14 of the inner torus 8 a waveform curve 22 having amplitude and wavelength is generated as follows:

the wavelength 23 is defined along the circumference of the median circle 19 and the amplitude variation 24 being defined perpendicularly to the median circle plane and the said waveform curve has a constant wavelength and the number of wavelengths contained in the median circle is an integer;

the areas 25 contained between the waveform curve and the median circle associated with the half of the wavelength 26 being constant and symmetric/ equal with each other and being identical in terms of profile and form as well as the areas 27 associated with the quarters of wavelength 28 being also constant and symmetrical/equal with each other and being identical in terms of profile and form;

therefore on the outer surface of the inner torus we have along the median circle as a circular axis a symmetrical/regular oscillating curve with constant wavelength and amplitude, the number of wavelengths contained in the median circle being an integer;

a generating profile defined as follows:

a plane 29 perpendicular to the waveform curve, therefore intersecting the waveform curve in only one point 30, the perpendicular plane intersecting the inner surface of the outside torus and the outer surface 14 of the inner torus;

whereby from the intersecting resulting intersection curves 31 on the inner surface 17 of the exterior torus and the outer surface 14 of the interior torus, these intersection curves, depending of the position of the perpendicular plane could be either straight lines or slightly curved lines;

on each line of the intersection between the perpendicular plane and the inner surface of the outer torus and the outer surface of the inner torus are selected 2 points 32;

the points 33 from the inner surface of the outer torus are united with the points 34 from the outer surface of the inner torus, by uniting curves 34a contained in the perpendicular plane in such a way that these uniting curves are not intersecting each other and they are contained in the space between the toruses, in such a way that the four points, the uniting curves and the intersecting lines are defining a closed plane surface 35 or profile "abcd" having at the top and bottom the intersecting lines of the perpendicular plane with the inner surface of the exterior torus and with the outer surface of the interior torus and on the sides the said uniting curves contained in the perpendicular plane;

the closed plane surface/profile defined as above being hereinafter named the generating closed surface/contouring/profile;

it is important to remember that the generating closed surface/contouring/profile is contained in the perpendicular plane 29 therefore is all the time perpendicular to the wave form curve, the upper and lower lines varying depending on the intersection with the toruses surfaces;

the generating process is started from a starting point which can be any point on the wave form curve but for the ease of understanding it is supposed to start from a point 36 where the wave form curve is intersecting the median circle;

the surface/solid generating process is done by, moving the generated closed surface/ contouring/profile 35 along the wave form curve respecting the above conditions, the uniting curves describing/contouring the surface structure of the said wave form undulating structure between the toruses;

whereby, the waveform undulating structure being unitized/rigidized together by casting or any other known approach, forming a toroidal elastic structure 37 having an inner diameter 38, which is the inner diameter of the interior torus and an outside diameter 39 which is the outside diameter of the exterior torus;

whereby the toroidal elastic structure has on the outside a rim 39 for rolling and on the inside a hub 40 to provide a wheel made of the toroidal elastic structure and the rim and hub;

in a simpler case, the wave form curve on the outer surface of the inner torus being defined as follows:

a curve 41 in the form of a semicircle 42 called semicircle module having a beginning 43 and an end 44 these being diametrally opposed;

the inner torus being cut with a plane 45 containing its axis of symmetry 16; the inner torus then is unfolded 46 and on the unfolded outer surface 47 and in reference with the median circle 19 above defined and also unfolded, a wave form curve is traced characterized by the fact that is formed of a succession of semicircle modules 42 all having the same radius;

therefore if the wave form curve is starting from a point 48 on the median circle, there we have placed the first semicircle module 49 with the beginning in the starting point and the end diametrally opposed but on the median circle unfolded, and after this another semicircle module 50 but rotated accordingly to permit a continuation of the waveform curve; so the wave form curve is a continuous unicursal succession of semicircle modules;

then the unfolded torus with the waveform curve as described above is brought back to toroidal form 51, in this way having the wave form curve defined on the outer surface 14 of the inner torus 8;

a contouring profile is defined as above except the uniting curves are straight lines forming parallel sides 53 centered about the waveform curve 53 intersecting with the axis of symmetry/rotation of the toruses therefore all the time perpendicular on the outer surface of the inner torus and on the inner surface of the exterior torus such that the cross-section 52 may be rectangular;

whereby the straight lines as defined above are equally distanced 54 from the wave form curve on the inner surface of the inner torus;

whereby at the areas of intersection of the waveform structure and the inner/outer surfaces of the toruses there are provided appropriate fillets to reduce the concentration stresses;

whereby the wave-like structure has a width which is twice the amplitude of the wave which is less than the width of the toruses;

The main advantage of the application of this invention is the fact that the proposed class of non-pneumatic tire is using the full advantage of the curved or circular bodies to sustain bigger buckling forces than the web like bodies of the same volume.

The embodiments of the invention in which an exclusive property or/and privilege under the laws is claimed are defined as follows:

1. A non-pneumatic tire for mounting upon a wheel hub, wherein the tire has an axis of rotation and a central plane perpendicular to the axis of rotation and wherein the tire is comprised of:
   (a) an exterior torus which
      1) has an outside diameter and has a constant inside diameter and
      2) is symmetric about the axis of rotation;
   (b) an interior torus which
      1) is mountable upon the wheel hub,
      2) has an inside diameter and a constant outside diameter,
      3) is symmetric about the axis of rotation and
      4) is positioned between the exterior torus inside diameter and the axis of rotation;
   (c) wherein the interior torus outside diameter is less than the exterior torus inside diameter thereby defining a space between the exterior torus and the interior torus;
   (d) a flexing structure comprised of a wall with two parallel sides extending within the space between and connecting to the exterior torus at the inside diameter and the interior torus at the outside diameter;
   (e) wherein the two sides of the wall are centered about an undulating curved line projected from the interior torus at the outside diameter upon the exterior torus at the inside diameter;
   (f) wherein the curved line intersects with and oscillates about the central plane;
   (g) wherein the sides of the wall have a constant radial length between the outside diameter of the inner torus and the inside diameter of the outside torus; and
   (h) wherein the sides of the wall are parallel to the central plane at the portions of the wall furthest from the central plane.

2. The non-pneumatic tire according to claim 1 wherein the curved line is sinusoidal.

3. The non-pneumatic tire according to claim 1, wherein the curved line is symmetric about the central plane.

4. The non-pneumatic tire according to claim 3 wherein the curved line is perpendicular to the central plane at the intersection with the central plane.

5. The non-pneumatic tire according to claim 1, wherein the curved line forms a plurality of continuous wavelengths about the central plane.

6. The non-pneumatic tire according to claim 5 wherein each wavelength has an amplitude and the amplitude of each wavelength is equal.

7. The non-pneumatic tire according to claim 5 wherein there are an integer number of wavelengths about the tire.

8. The non-pneumatic tire according to claim 1 wherein the wall has a quadrilateral cross-section and the cross-section has equal thickness along the entire wall.

9. The non-pneumatic tire according to claim 8 wherein the wall has a rectangular cross-section.

10. The non-pneumatic tire according to claim 1 wherein each torus has a width and the inside diameter of the exterior torus and the outside diameter of the interior torus exterior are uniform across their respective widths.

11. The non-pneumatic tire according to claim 10 wherein the widths of the exterior torus and the interior torus are identical.

12. The non-pneumatic tire according to claim 1 wherein the interior torus is symmetric about the central plane.

13. The non-pneumatic tire according to claim 1 wherein the exterior torus is symmetric about the central plane.

14. The non-pneumatic tire according to claim 1 wherein the material of the tire is flexible.

15. The non-pneumatic tire according to claim 14 wherein the material of the tire is polyurethane.

16. A wheel having an axis of rotation and a central plane perpendicular to the axis of rotation comprised of a hub and a non-pneumatic tire secured to the hub, wherein the tire is comprised of:
   a) an exterior torus which
      1) has an outside diameter and has a constant inside diameter and
      2) is symmetric about the axis of rotation;

b) an interior torus which
   1) is mounted upon the wheel hub,
   2) has an inside diameter and a constant outside diameter,
   3) is symmetric about the axis of rotation and
   4) is positioned between the exterior torus inside diameter and the axis of rotation;
c) wherein the interior torus outside diameter is less than the exterior torus inside diameter thereby defining a space between the exterior torus and the interior torus;
d) a flexing structure comprised of a wall with two parallel sides extending within the space between and connecting to the exterior torus at the inside diameter and the interior torus at the outside diameter;
e) wherein the two sides of the wall are centered about an undulating curved line projected from the interior torus at the outside diameter upon the exterior torus at the inside diameter;
f) wherein the curved line intersects with and oscillates about the central plane;
g) wherein the sides of the wall have a constant radial length between the outside diameter of the inner torus and the inside diameter of the outer torus; and
h) wherein the sides of the wall are parallel to the central plane at the portions of the wall furthest from the central plane.

17. The non-pneumatic tire, according to claim 1, wherein the curved line is comprised of a series of connected opposing semicircles.

* * * * *